US012039908B2

(12) United States Patent
Gao et al.

(10) Patent No.: US 12,039,908 B2
(45) Date of Patent: Jul. 16, 2024

(54) DISPLAY PANEL, CONTROL METHOD OF DISPLAY PANEL, AND DISPLAY DEVICE

(71) Applicants: Huizhou China Star Optoelectronics Display Co., LTD., Guangdong (CN); SHENZHEN CHINA STAR OPTOELECTRONICS SEMICONDUCTOR DISPLAY TECHNOLOGY CO., LTD., Guangdong (CN)

(72) Inventors: Kuo Gao, Guangdong (CN); Lin Xiong, Guangdong (CN)

(73) Assignees: Huizhou China Star Optoelectronics Display Co., LTD., Huizhou (CN); SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/175,507

(22) Filed: Feb. 27, 2023

(65) Prior Publication Data

US 2024/0054933 A1 Feb. 15, 2024

(30) Foreign Application Priority Data

Aug. 15, 2022 (CN) ......................... 202210974501.4

(51) Int. Cl.
*G09G 3/20* (2006.01)

(52) U.S. Cl.
CPC ... *G09G 3/2003* (2013.01); *G09G 2300/0408* (2013.01); *G09G 2300/0452* (2013.01); *G09G 2320/0242* (2013.01)

(58) Field of Classification Search
CPC ......... G09G 3/2003; G09G 2300/0408; G09G 2300/0452; G09G 2320/0242
See application file for complete search history.

(56) References Cited

U.S. PATENT DOCUMENTS

2008/0224968 A1* 9/2008 Kashiwabara ....... G09G 3/3225 345/83
2012/0105517 A1* 5/2012 Yang ...................... G09G 3/003 345/694
2016/0189670 A1* 6/2016 Kim ..................... G09G 3/3208 345/82

(Continued)

*Primary Examiner* — Hong Zhou
(74) *Attorney, Agent, or Firm* — PV IP PC; Wei Te Chung; Zhigang Ma

(57) ABSTRACT

The present disclosure provides a display panel. The display panel includes: a substrate; a pixel driving circuit disposed on the substrate, the pixel driving circuit comprises driving sub-circuits; and a pixel layer disposed on the substrate, the pixel layer comprises pixel units arranged in an array, each of the pixel units comprises a red pixel, a green pixel, a first blue pixel, and a second blue pixel; each of the driving sub-circuits is in one-to-one correspondence with each color pixel, and a light transmission band of the first blue pixel is different from a light transmission band of the second blue pixel; in a first display mode, the pixel driving circuit drives the red pixels, the green pixels, and the first blue pixels to light up; in a second display mode, the pixel driving circuit drives the red pixels, the green pixels, and the second blue pixels to light up.

17 Claims, 4 Drawing Sheets

(56) References Cited

U.S. PATENT DOCUMENTS

| | | | | |
|---|---|---|---|---|
| 2018/0286299 | A1* | 10/2018 | Yang | H10K 59/351 |
| 2020/0098301 | A1* | 3/2020 | Bao | H10K 59/351 |
| 2021/0225958 | A1* | 7/2021 | Ko | H10K 59/353 |
| 2022/0293030 | A1* | 9/2022 | Wu | G09G 3/2003 |

* cited by examiner

DISPLAY PANEL, CONTROL METHOD OF DISPLAY PANEL, AND DISPLAY DEVICE

FIELD OF DISCLOSURE

The present application relates to a field of display technology, and particularly to a display panel, a control method of the display panel, and a display device.

BACKGROUND OF DISCLOSURE

Quantum dot (QD) display devices have gradually become another type of high-end display devices after OLED due to their advantages such as an ultra-high contrast ratio, wide color gamut, and wide viewing angles. At present, TVs and display devices using QD materials are all defined as high-end products by various manufacturers. In particular, the advantage of wide color gamut of QD display technology is a display technology that is closest to the BT.2020 color gamut standard among all display technologies so far. Although QD light-emitting principles of various manufacturers are different, all of them use quantum dot materials. However, on another hand, with more and more display applications and longer usage time, the QD display technology is not good for health of human eyes. In particular, QD blue light materials have high color purity and can achieve deep-blue light emission (a short wavelength), which may contain harmful blue light components. Therefore, there is an urgent need for a display panel that can take into account both display performance (the wide color gamut) and eye protection requirements (low blue light).

SUMMARY OF DISCLOSURE

Technical Solutions

Embodiments of the present disclosure provide a display panel, a control method of the display panel, and a display device. By setting different types of blue pixels, and adjusting and lighting different blue pixels, switching between different modes of the display panel is realized.

In a first aspect, the present disclosure provides a display panel, including:

a substrate;

a pixel driving circuit, disposed on the substrate, wherein the pixel driving circuit comprises a plurality of driving sub-circuits;

a pixel layer, disposed on the substrate, wherein the pixel layer comprises pixel units arranged in an array, each one of the pixel units comprises a red pixel, a green pixel, a first blue pixel, and a second blue pixel, each of the driving sub-circuits is in one-to-one correspondence with each color pixel, and the driving sub-circuit is used to drive a corresponding color pixel to light up, and a light transmission band of the first blue pixel is different from a light transmission band of the second blue pixel;

wherein in a first display mode, the pixel driving circuit drives the red pixels, the green pixels, and the first blue pixels to light up; or, in a second display mode, the pixel driving circuit drives the red pixels, the green pixels, and the second blue pixels are light up.

In some embodiments of the present disclosure, wherein a second color gamut range of the second display mode is larger than a first color gamut range of the first display mode.

In some embodiments of the present disclosure, wherein an allowable transmission wavelength of the first blue pixel is greater than 400 nanometers.

In some embodiments of the present disclosure, wherein an irradiance of wavelengths within a preset intensity range of the allowable transmission wavelengths corresponding to the blue light is less than or equal to 20% of an irradiance of the allowable transmission wavelengths corresponding to the blue light.

In some embodiments of the present disclosure, wherein in the allowable transmission wavelength, a ratio of an energy of blue light with a wavelength of 415 nanometers to 455 nanometers and an energy of blue light with a wavelength of 400 nanometers to 500 nanometers is less than or equal to a preset threshold.

In some embodiments of the present disclosure, a wavelength corresponding to an intensity extreme value of the light transmission band of the second blue pixel is less than 450 nanometers.

In some embodiments of the present disclosure, wherein a material of the pixel layer is quantum dots.

In a second aspect, the present disclosure provides a control method of a display panel, the control method of the display panel is applied in the display panel as above, the control method of the display panel includes:

acquiring color coordinates of each of the pixel unit in a displaying image;

if the color coordinates all belong to a first color gamut range of a first display mode, lighting up the red pixels, the green pixels, and the first blue pixels corresponding to the first display mode;

if one of the color coordinates does not belong to the first color gamut range of the first display mode, but belongs to a second color gamut range of a second display mode, lighting up the red pixels, the green pixels, and the second blue pixels corresponding to the second display mode.

In some embodiments of the present disclosure, wherein before acquiring the color coordinates of each of the pixel unit in the displaying image, the control method of the display panel includes:

acquiring optical parameters of the red pixels, the green pixels, the first blue pixels and the second blue pixels; and defining a first color gamut range and a second color gamut range according to the optical parameters, the second color gamut range is larger than the first color gamut range.

In a third aspect, the present disclosure provides a display device, the display device includes the display panel as above.

In some embodiments of the present disclosure, the display panel includes:

a substrate;

a pixel driving circuit, disposed on the substrate, wherein the pixel driving circuit comprises a plurality of driving sub-circuits;

a pixel layer, disposed on the substrate, wherein the pixel layer comprises pixel units arranged in an array, each one of the pixel units comprises a red pixel, a green pixel, a first blue pixel, and a second blue pixel, each of the driving sub-circuits is in one-to-one correspondence with each color pixel, and the driving sub-circuit is used to drive a corresponding color pixel to light up, and a light transmission band of the first blue pixel is different from a light transmission band of the second blue pixel;

wherein in a first display mode, the pixel driving circuit drives the red pixels, the green pixels, and the first blue pixels to light up; or, in a second display mode, the pixel driving circuit drives the red pixels, the green pixels, and the second blue pixels are light up.

In some embodiments of the present disclosure, wherein a second color gamut range of the second display mode is larger than a first color gamut range of the first display mode.

In some embodiments of the present disclosure, wherein an allowable transmission wavelength of the first blue pixel is greater than 400 nanometers.

In some embodiments of the present disclosure, wherein an irradiance of wavelengths within a preset intensity range of the allowable transmission wavelengths corresponding to the blue light is less than or equal to 20% of an irradiance of the allowable transmission wavelengths corresponding to the blue light.

In some embodiments of the present disclosure, wherein in the allowable transmission wavelength, a ratio of an energy of blue light with a wavelength of 415 nanometers to 455 nanometers and an energy of blue light with a wavelength of 400 nanometers to 500 nanometers is less than or equal to a preset threshold.

In some embodiments of the present disclosure, a wavelength corresponding to an intensity extreme value of the light transmission band of the second blue pixel is less than 450 nanometers.

In some embodiments of the present disclosure, wherein a material of the pixel layer is quantum dots.

In the display panel, the control method of the display panel, and the display device provided by the embodiments of the present disclosure, different types of blue pixels are set, and the light transmittance bands of the blue pixels matched with the red pixels and the green pixels in different display modes are different; that is, by adjusting and lighting different blue pixels to realize switching between different modes of the display panel, so that a same display panel can meet different display requirements.

BRIEF DESCRIPTION OF DRAWINGS

The technical solutions and other beneficial effects of the present disclosure will be apparent through the detailed description of the specific embodiments of the present disclosure in conjunction with the accompanying drawings.

REFERENCE NUMBER

Figure 1:
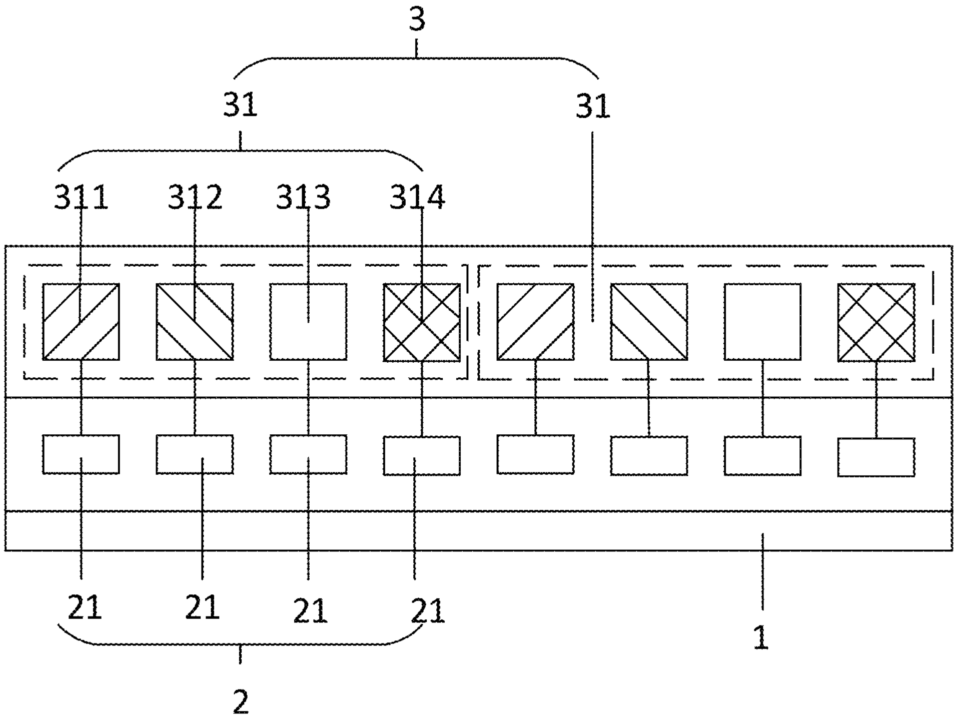
FIG. 1 is a structural schematic diagram of a display panel in an embodiment of the present disclosure.

1. substrate; 2. pixel driving circuit; 21. driving sub-circuit; 3. pixel layer; 31. pixel unit; 311. red pixel; 312. green pixel; 313. first blue pixel; 314. second blue pixel; 4. first color gamut range; 5. second color gamut range.

DETAILED DESCRIPTION OF EMBODIMENTS

The technical solutions in the embodiments of the present disclosure will be clearly and completely described in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within a protection scope of the present disclosure.

In the description of the present disclosure, it should be understood that, an orientation or positional relationship indicated by terms "center", "portrait", "landscape", "length", "width", "thickness", "above", "below", "front", "back", "left", "right", "vertical straight", "horizontal", "upper", "bottom" "inner", "outer", "clockwise, "counter clockwise", etc. are based on an orientation or positional relationship shown in the drawings, and is only for convenience of describing the disclosure and simplifying the description. It does not indicate or imply that a pointed device or an element must have a specific orientation, or be configured and operated in a specific orientation, and therefore it cannot be understood as a limitation of the present disclosure. In addition, terms "first" and "second" are only used for descriptive purposes, and cannot be understood as indicating or implying relative importance or implicitly indicating a number of indicated technical features. Therefore, the features defined with "first" and "second" may explicitly or implicitly include one or more of the features. In the description of the present disclosure, "a plurality of" means two or more, unless otherwise specifically defined.

In a description of this disclosure, it should be noted that, unless otherwise expressly specified and limited, the terms "installed", "interconnected" and "connected" should be understood in a broad sense, for example, it may be a fixed connection or a detachable connection, or an integral connection; it can be a mechanical connection, an electrical connection, or communication with each other; it can be directly connected or indirectly connected through an intermediate medium, it can be an internal communication of two elements or an interaction relation between two elements. For those of ordinary skill in the art, the specific meanings of the terms as above in this disclosure can be understood according to specific situations.

In this disclosure, unless otherwise expressly specified and limited, a first feature "on" or "under" a second feature may include the first feature is directly connected to the second feature, or may include the first feature and the second feature are not in a direct contact, but through another feature between them. Also, the first feature is "above", "over" and "top" the second feature includes that the first feature is directly above and obliquely above the second feature, or simply means that the first feature is level higher than the second feature. The first feature is "below", "under" and "down" the second feature includes that the first feature is directly below and diagonally below the second feature, or simply means that the first feature has a lower level than the second feature.

The following disclosure provides many different embodiments or examples for implementing different structures of the present disclosure. In order to simplify the details of the present disclosure, the components and arrangements of specific examples are described below. Of course, they are only examples and are not intended to limit the disclosure.

The present disclosure may repeat reference numerals and/or reference letters in different implementations, and this repetition is for a purpose of simplification and clarity, and does not indicate a relationship between various embodiments and/or settings discussed.

In addition, the present disclosure provides examples of various specific processes and materials, but ordinary skills in the art will recognize the disclosure of other processes and/or the use of other materials.

Please refer to FIG. 1, an embodiment of the present disclosure provides a display panel. The display panel includes a substrate 1, a pixel driving circuit 2, and a pixel layer 3. The pixel driving circuit 2 and the pixel layer 3 are both disposed on the substrate 1. The pixel driving circuit 2 is used to drive the pixel layer 3 to light up.

The pixel driving circuit 2 includes several driving sub-circuits 21. The pixel layer 3 includes pixel units 31 arranged in an array. The pixel unit 31 is a smallest unit that includes pixels of various colors for display. If the display panel realizes image display through three primary colors, correspondingly, the pixel unit 31 includes pixels of three colors: red, green, and blue. If the display panel realizes image display by using four kinds of color pixels, correspondingly, the pixel unit 31 includes four kinds of color pixels. In this embodiment, the pixel unit 31 includes a red pixel 311, a green pixel 312, a first blue pixel 313, and a second blue pixel 314, each of the driving sub-circuits 21 corresponds to each color pixel one-to-one, and the driving sub-circuits 21 are respectively used to control corresponding color pixels to light up, and the color pixels are the red pixels 311, the green pixels 312, the first blue pixels 313, and the second blue pixels 314 above-mentioned.

A light transmission band of the first blue pixel 313 is different from a light transmission band of the second blue pixel 314. The light transmittance band of the first blue pixel 313 is set to a non-harmful blue light band. The light transmittance band of the second blue pixel 314 is set to a harmful blue light band. That is, the light transmission band of the first blue pixel 313 is closer to light transmission bands of the red pixel 311 and the green pixel 312 than the light transmission band of the second blue pixel 314.

When the display panel is set to a first display mode, the pixel driving circuit 2 drives the red pixel 311, the green pixel 312, and the first blue pixel 313 to emit light, and the second blue pixel 314 does not emit light. Since the light transmittance band of the first blue pixel 313 is set to a non-harmful blue light band, the light emitted by the display panel at this time does not contain harmful blue light, which is an eye protection mode.

When the display panel is set to a second display mode, the pixel driving circuit 2 drives the red pixel 311, the green pixel 312, and the second blue pixel 314 to emit light, and the first blue pixel 313 does not emit light. Since the light transmission band of the first blue pixel 313 and the light transmission band of the second blue pixel 314 are different, the color gamut of the second display mode is different from that of the first display mode. The light transmission band of the second blue pixel 314 in the second display mode is not limited to requirements of eye protection, so a wider color gamut can be obtained by adjusting optical parameters such as wavelengths and color coordinates of the second blue pixel 314.

In this embodiment, by setting different types of blue pixels and adjusting and lighting different blue pixels, switching between different modes such as the eye protection mode and a wide color gamut mode can be realized, so as to address both display performance (the wide color gamut) and eye protection requirements (low blue light) at the same time.

Figure 2:
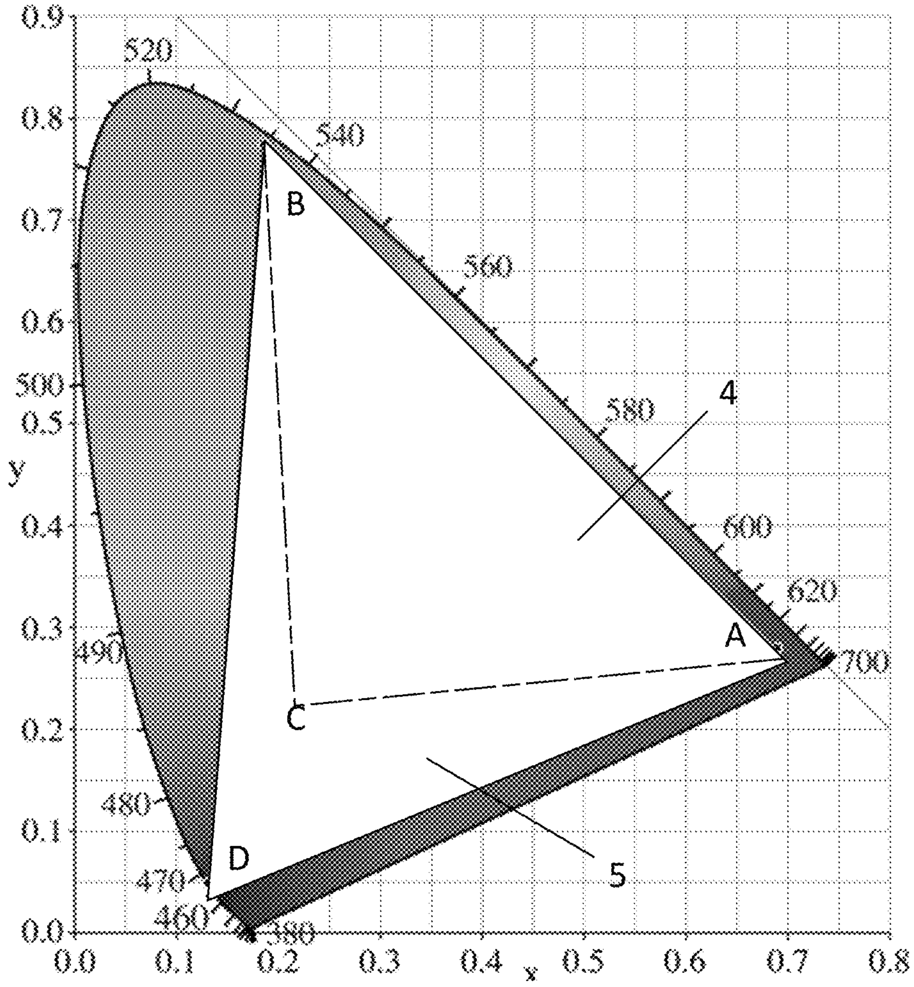
FIG. 2 is a schematic diagram of a color gamut range of the display panel in an embodiment of the present disclosure.

In one embodiment, as shown in FIG. 2, the red pixels 311 and the green pixels 312 are not adjusted when the modes are switched. After setting relevant optical parameters of the first blue pixel 313 based on eye protection requirements, a first color gamut range 4 of the first display mode is determined based on the relevant optical parameters of the red pixels 311, the green pixels 312, and the first blue pixels 313. However, setting the first blue pixels 313 based on the eye protection requirements results in the first color gamut range 4 of the first display mode being limited. Therefore, the second blue pixels 314 is set for realizing the second display mode, and a second color gamut range 5 of the second display mode is set to be larger than the first color gamut range 4 of the first display mode; that is, the wide color gamut mode is set outside the eye protection mode.

Further, the second color gamut range 5 of the second display mode includes the first color gamut range 4 of the first display mode. Wherein when a color coordinate of the second blue pixel 314 is closer to an origin of a color coordinate system than a color coordinate of the first blue pixel 313, that is, a distance from the color coordinate of the second blue pixel 314 to the origin of the color coordinate system is less than a distance from the color coordinate of the first blue pixel 313 to the origin of the color coordinate system, the second color gamut range 5 of the second display mode includes the first color gamut range 4 of the first display mode. As shown in FIG. 2, a color coordinate of the red pixel 311 corresponds to a point A, a color coordinate of the green pixel 312 corresponds to a point B, the color coordinate of the first blue pixel 313 corresponds to a point C, and the color coordinate of the second blue pixel 314 corresponds to a point D; the first color gamut range 4 is formed by three points: the point A, the point B, and the point C, and the second color gamut range 5 is formed by three points: the point A, the point B, and the point D. The second color gamut range 5 is greater than the first color gamut range 4. Further, the second color gamut range 5 includes the first color gamut range 4. It should be noted that the color gamut ranges shown in FIG. 2 are an example for facilitating understanding, and it should not be understood that this embodiment is limited to this.

When the display panel is in the first display mode, which is the eye protection mode, and when the display panel is in the second display mode, which is the wide color gamut mode, the display panel can select an appropriate mode for display based on user requirements or the color coordinates of each pixel in a to-be-displayed image; that is, the display panel in this embodiment can address both the display performance (the wide color gamut) and the eye protection requirements (the low blue light) at the same time.

Figure 3:
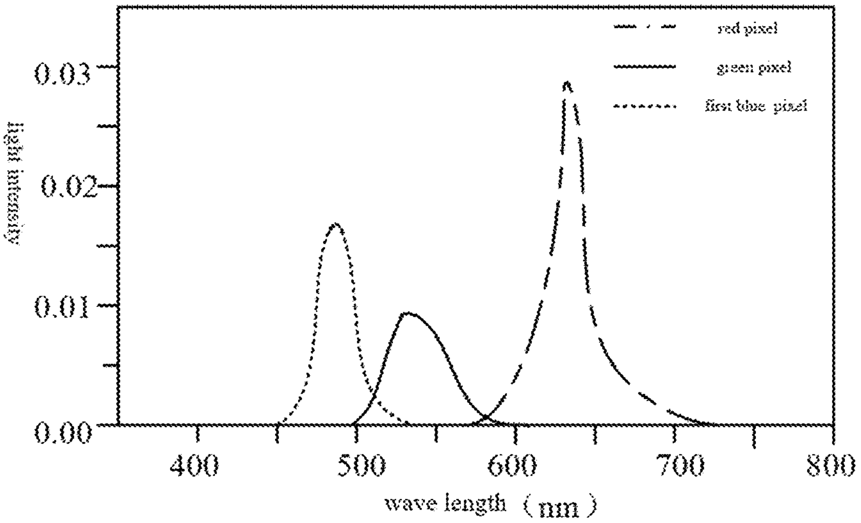
FIG. 3 is a wavelength-light intensity correspondence diagram corresponding to red pixels, green pixels, and first blue pixels in an embodiment of the present disclosure.
Figure 4:
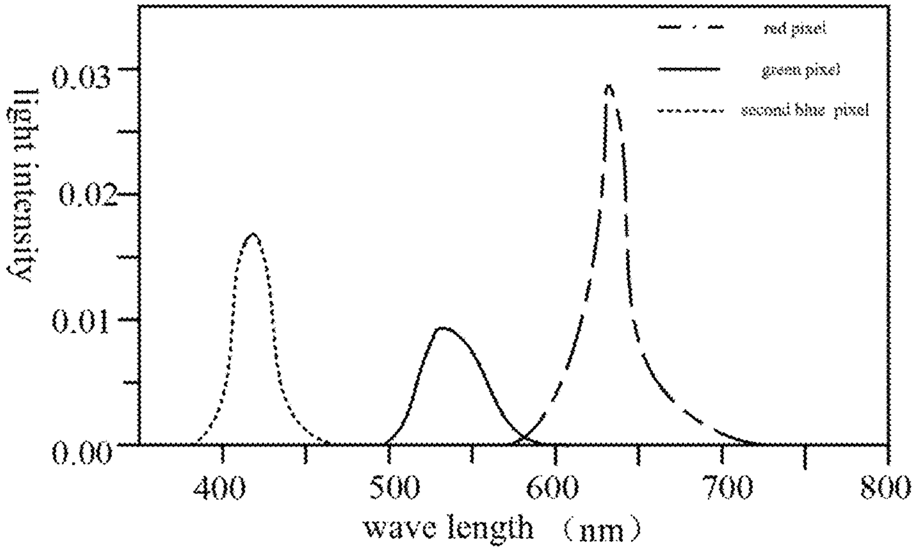
FIG. 4 is a wavelength-light intensity correspondence diagram corresponding to the red pixels, the green pixels, and second blue pixels in an embodiment of the present disclosure.
Figure 5:
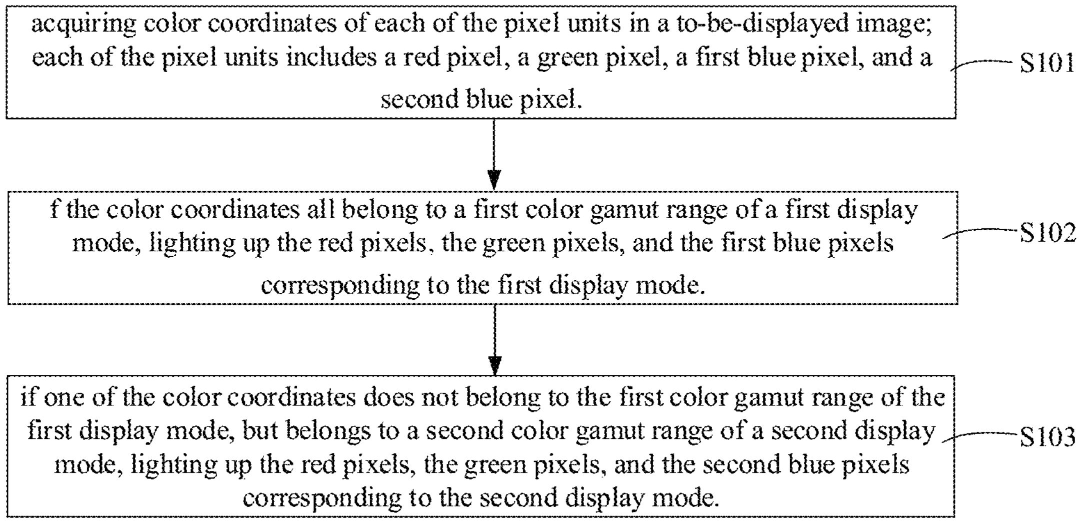
FIG. 5 is a flowchart schematic diagram of a control method of the display panel in an embodiment of the present disclosure.

In one embodiment, based on the eye protection requirements, an allowable transmission wavelength of the first blue pixel 313 is greater than 400 nanometers (that is, without UV light). For the second blue pixel 314, in order to distinguish it from the first blue pixel 313, a wavelength corresponding to an intensity extreme value of the light transmission band of the second blue pixel 314 is less than 450 nanometers, and the intensity extreme value of the light transmission band of the second blue pixel 314 is a wavelength corresponding to a point of a maximum light intensity of an emission spectrum (wavelength-light intensity spectrum) of the second blue pixel 314; that is, the wavelength corresponding to a peak in the emission spectrum of the second blue pixel 314 is less than 450 nanometers. In one embodiment, the wavelength-light intensity spectrum corresponding to the red pixel 311, the green pixel 312, and the first blue pixel 313 is shown in FIG. 3, and the wavelength-light intensity spectrum corresponding to the red pixel 311, the green pixel 312, and the second blue pixel 314 is shown in FIG. 4. The corresponding first color gamut range 4 and the corresponding second color gamut range 5 are shown in FIG. 2. In addition, based on the requirement of the wide color gamut, the color coordinate of the second blue pixel 314 is closer to the origin of the color coordinate system than the color coordinate of the first blue pixel 313. Other parameter performances are not specifically limited in this embodiment.

In one embodiment, an irradiance of wavelengths within a preset intensity range of the allowable transmission wavelengths of the first blue pixel 313 corresponding to the blue light is less than or equal to 20% of an irradiance of the allowable transmission wavelengths corresponding to the blue light, wherein the preset intensity range is a fluctuation range based on peaks in the emission spectrum of the second blue pixel 314. The smaller the fluctuation range is set, the better an eye protection effect of a pixel of a corresponding color is. Therefore, the fluctuation range can be set based on requirements of an eye protection accuracy. For example, if the fluctuation range is set to ±20 nanometers, the preset intensity range is ±20 nanometers of the peak; that is, irradiance within a range of the peak of the blue light ±20 nanometers should not exceed 20% of the irradiance in an entire spectral range.

In one embodiment, in the allowable transmission wavelength of the first blue pixel 313, a ratio of an energy of blue light with a wavelength of 415 nanometers to 455 nanometers to an energy of blue light with a wavelength of 400 nanometers to 500 nanometers is less than or equal to a preset threshold, so as to minimize harmful blue light and blue light with excessive intensity incident into the human eyes as much as possible. A maximum value of the preset threshold is set to 50%, that is, a proportion of the light in a range of 415 nanometers to 455 nanometers to a range of 400 nanometers to 500 nanometers is less than 50%, and the smaller the proportion of the light in the range of 415 nanometers to 455 nanometers to the range of 400 nanometers to 500 nanometers is, the better the eye protection effect, so the smaller the preset threshold setting is, the higher the requirements for blue light protection of the display panel. It should be noted that the preset intensity range and the preset threshold can be freely set based on different eye protection requirements, which are not specifically limited in this embodiment.

In one embodiment, since pixels coated with different colors themselves do not emit light, generally, light emitted by a light source irradiates each of the pixels and then emits light with a corresponding color. Therefore, each color pixel actually includes a light-emitting source and sub-pixels corresponding to the light-emitting source (not shown in the figures), that is, each of the pixel units 31 includes a light-emitting source and a corresponding red sub-pixel, a corresponding green sub-pixel, a corresponding first blue sub-pixel, and a corresponding second blue sub-pixel. Wherein each of the driving sub-circuits 21 is in one-to-one correspondence with a light-emitting source, and sub-pixels of each color are arranged on the corresponding light-emitting source. The driving sub-circuits 21 are respectively used to control the corresponding light-emitting source to turn on or off. When a certain driving sub-circuit 21 drives the corresponding light-emitting source to emit light, the light irradiates the corresponding color sub-pixel to emit light with the corresponding color.

When the display panel is set to the first display mode, the pixel driving circuit 2 drives the light-emitting sources corresponding to the red sub-pixel, the green sub-pixel, and the first blue sub-pixel to light up, and the light-emitting source corresponding to the second blue sub-pixel does not emit light. When the display panel is set to the second display mode, the pixel driving circuit 2 drives the light-emitting sources corresponding to the red sub-pixel, the green sub-pixel, and the second blue sub-pixel to light up, and the light-emitting source corresponding to the first blue sub-pixel does not emit light.

Wherein a material of the pixel layer 3 can be set to be quantum dots, and quantum dot display has an advantage of a wide color gamut. However, a blue light material of quantum dots has high color purity, can achieve deep-blue light emission (short wavelengths), and may contain harmful blue light components. By switching modes in this embodiment, harm of the blue light can be reduced, and at the same time, the wide color gamut advantage of the quantum dots can be fully utilized.

In one embodiment, in the driving sub-circuit 21 corresponding to the second blue pixel 314 in the first display mode, scan lines are configured as connected signals, and data lines are configured as disconnected signals. In the driving sub-circuit 21 corresponding to the first blue pixel 313 in the second display mode, the scan lines are configured as connected signals, and the data lines are configured as disconnected signals. That is, whether the display panel is in the first display mode or the second display mode, when a row of pixels is driven to display, the scan lines of the driving sub-circuit 21 corresponding to the row of pixels are configured as the connected signals, and the signals passing through the data lines realize the display of different modes; that is, in this embodiment, the controller IC adjusts a control sequence to realize the display of different modes. A structure of the pixel driving circuit 2 itself and a connection mode of each of the driving sub-circuits 21 and the color pixels are structures commonly used in the field. Examples are not specifically limited.

In this embodiment, by setting different types of blue pixels and adjusting and lighting different blue pixels, switching between different modes such as the eye protection mode and the wide color gamut mode can be realized, so as to address both the display performance (the wide color gamut) and the eye protection requirements (the low blue light) at the same time.

Please refer to FIGS. 1 to 5, an embodiment of the present disclosure provides a control method of a display panel, which is applied to the display panel described in any of the foregoing embodiments, and the control method includes:

S101, acquiring color coordinates of each of the pixel units in a to-be-displayed image; each of the pixel units includes a red pixel 311, a green pixel 312, a first blue pixel 313, and a second blue pixel 314.

S102, if the color coordinates all belong to a first color gamut range 4 of a first display mode, lighting up the red pixels 311, the green pixels 312, and the first blue pixels 313 corresponding to the first display mode.

S103, if one of the color coordinates does not belong to the first color gamut range 4 of the first display mode, but belongs to a second color gamut range 5 of a second display mode, lighting up the red pixels 311, the green pixels 312, and the second blue pixels 314 corresponding to the second display mode.

The pixel unit 31 is a smallest unit that includes pixels of various colors for display. If the display panel realizes image display through three primary colors, correspondingly, the pixel unit 31 includes pixels of three colors: red, green, and blue. If the display panel realizes image display by using four kinds of color pixels, correspondingly, the pixel unit 31 includes four kinds of color pixels. In this embodiment, the pixel unit 31 includes a red pixel 311, a green pixel 312, a first blue pixel 313, and a second blue pixel 314.

The first display mode corresponds to the red pixel 311, the green pixel 312, and the first blue pixel 313, and the second display mode corresponds to the red pixel 311, the green pixel 312, and the second blue pixel 314. acquiring color coordinates of each pixel in the to-be-displayed image. Since the second color gamut range 5 of the second display mode is larger than the first color gamut range 4 of the first display mode, the first display mode is the eye protection mode; therefore, if the color coordinates of all pixels in the to-be-displayed image belong to the first color gamut range 4 of the first display mode, that is, the first display mode can completely display the colors of each pixel in the to-be-displayed image, then the red pixel 311, the green pixel 312, and the first blue pixel 313 corresponding to the first display mode is lighted up to realize the display of the to-be-displayed image, while protecting the eyes and not affecting the display effect of the image.

If there is at least one color coordinate of at least one pixel in the color coordinates of all the pixels of the to-be-displayed image that does not belong to the first color gamut range 4 of the first display mode, that is, the first display mode cannot display all the colors in the to-be-displayed image, so the red pixels 311, the green pixels 312, and the second blue pixels 314 corresponding to the second display mode are lighted up to realize the display of the to-be-displayed image, and the second display mode of the wide color gamut is prevented from affecting the display effect.

Wherein color coordinates of each pixel in the to-be-displayed image in a next frame are acquired every preset period, and then the display mode is selected according to the above method. The preset period can be freely set as required, for example, the preset period can be set to one frame, ten frames, etc., wherein the shorter the preset period, the better the display effect, but the higher processing requirements of the display panel.

It should be noted that the display mode can be switched according to mode instructions selected by the user. For example, if the user selects the first display mode, the color coordinates of each pixel in the to-be-displayed image are not acquired to switch the display mode, but the display is maintained in the first display mode until the display mode is switched again according to the user's mode instructions. The mode instructions include a first display mode command, a second display mode command, and an intelligent display mode command, and the intelligent display mode command is the above-mentioned intelligent selection of the first display mode or the first display mode according to the acquired color coordinates of each pixel in the to-be-displayed image.

Figure 6:
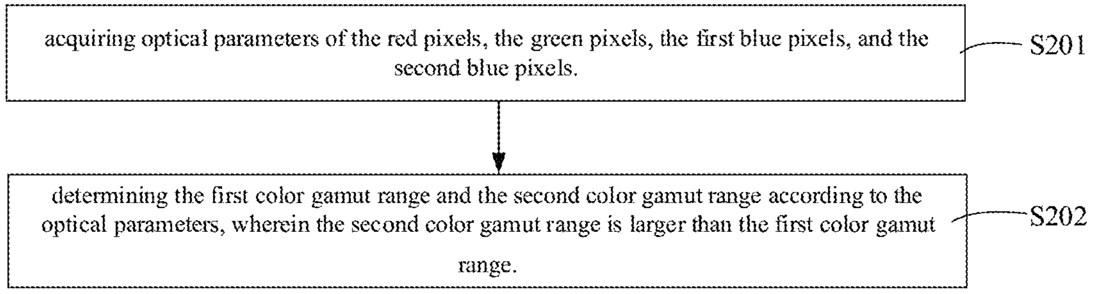
FIG. 6 is a flowchart schematic diagram of the control method of the display panel in an embodiment of the present disclosure.

In one embodiment, as shown in FIG. 6, before acquiring the color coordinates of each pixel in the to-be-displayed image in the S101, the control method of the display panel further includes:

S201, acquiring optical parameters of the red pixels 311, the green pixels 312, the first blue pixels 313, and the second blue pixels 314.

S202, determining the first color gamut range 4 and the second color gamut range 5 according to the optical parameters, wherein the second color gamut range is larger than the first color gamut range.

Specifically, based on the eye protection requirements, an allowable transmission wavelength of the first blue pixel 313 is greater than 400 nanometers (that is, without UV light). For the second blue pixel 314, in order to distinguish it from the first blue pixel 313, a wavelength corresponding to an intensity extreme value of a light transmission band of the second blue pixel 314 is less than 450 nanometers, and the intensity extreme value of the light transmission band of the second blue pixel 314 is a wavelength corresponding to a point of a maximum light intensity of an emission spectrum (wavelength-light intensity spectrum) of the second blue pixel 314, that is, the wavelength corresponding to a peak in the emission spectrum of the second blue pixel 314 is less than 450 nanometers. In one embodiment, the wavelength-light intensity spectrum corresponding to the red pixel 311, the green pixel 312, and the first blue pixel 313 is shown in FIG. 3, and the wavelength-light intensity spectrum corresponding to the red pixel 311, the green pixel 312, and the second blue pixel 314 is shown in FIG. 4. The corresponding first color gamut range 4 and the corresponding second color gamut range 5 are shown in FIG. 2. In addition, based on the requirement of the wide color gamut, the color coordinate of the second blue pixel 314 is closer to the origin of the color coordinate system than the color coordinate of the first blue pixel 313. Other parameter performances are not specifically limited in this embodiment.

An irradiance of wavelengths within a preset intensity range of the allowable transmission wavelengths of the first blue pixel 313 corresponding to the blue light is less than or equal to 20% of an irradiance of the allowable transmission wavelengths corresponding to the blue light, wherein the preset intensity range is a fluctuation range based on peaks in the emission spectrum of the second blue pixel 314. The smaller the fluctuation range is set, the better the eye protection effect of a pixel of corresponding color is. Therefore, the fluctuation range can be set based on requirements of an eye protection accuracy. For example, if the fluctuation range is set to ±20 nanometers, the preset intensity range is ±20 nanometers of the peak; that is, the irradiance within a range of the peak of the blue light ±20 nanometers should not exceed 20% of the irradiance in an entire spectral range.

In the allowable transmission wavelength of the first blue pixel 313, a ratio of an energy of blue light with a wavelength of 415 nanometers to 455 nanometers to an energy of blue light with a wavelength of 400 nanometers to 500 nanometers is less than or equal to a preset threshold, so as to minimize harmful blue light and blue light with excessive intensity into the human eyes. A maximum value of the preset threshold is set to 50%, that is, a proportion of the light in a range of 415 nanometers to 455 nanometers to a range of 400 nanometers to 500 nanometers is less than 50%, and the smaller the proportion of the light in the range of 415 nanometers to 455 nanometers to the range of 400 nanometers to 500 nanometers is smaller, the better the eye protection effect, so the smaller the preset threshold setting is, the higher the requirements for blue light protection of the display panel. It should be noted that the preset intensity range and the preset threshold can be freely set based on different eye protection requirements, which are not specifically limited in this embodiment.

The red pixels 311 and the green pixels 312 are not adjusted when the modes are switched. After setting relevant optical parameters of the first blue pixel 313 based on eye protection requirements, a first color gamut range 4 of the first display mode is determined based on the relevant optical parameters of the red pixels 311, the green pixels 312, and the first blue pixels 313. However, setting the first blue pixels 313 based on the eye protection requirements results in the first color gamut range 4 of the first display mode being limited. Therefore, the second blue pixels 314 is set for realizing the second display mode, and a second color gamut range 5 of the second display mode is set to be larger than the first color gamut range 4 of the first display mode; that is, the wide color gamut mode is set outside the eye protection mode.

Further, the second color gamut range 5 of the second display mode includes the first color gamut range 4 of the first display mode. Wherein when a color coordinate of the second blue pixel 314 is closer to an origin of a color coordinate system than a color coordinate of the first blue pixel 313, that is, a distance from the color coordinate of the second blue pixel 314 to the origin of the color coordinate system is less than a distance from the color coordinate of the first blue pixel 313 to the origin of the color coordinate system, the second color gamut range 5 of the second display mode includes the first color gamut range 4 of the first display mode. As shown in FIG. 2, a color coordinate of the red pixel 311 corresponds to a point A, a color coordinate of the green pixel 312 corresponds to a point B, the color coordinate of the first blue pixel 313 corresponds to a point C, and the color coordinate of the second blue pixel 314 corresponds to a point D; the first color gamut range 4 is formed by three points: the point A, the point B, and the point C, and the second color gamut range 5 is formed by three points: the point A, the point B, and the point D. The second color gamut range 5 is greater than the first color gamut range 4. Further, the second color gamut range 5 includes the first color gamut range 4. It should be noted that the color gamut ranges shown in FIG. 2 are an example for facilitating understanding, and it should not be understood that this embodiment is limited to this.

In this embodiment, by setting different types of blue pixels and adjusting and lighting different blue pixels, switching between different modes such as the eye protection mode and the wide color gamut mode can be realized, so as to address both the display performance (the wide color gamut) and the eye protection requirements (the low blue light) at the same time.

In the above-mentioned embodiments, the description of each embodiment has its own emphasis. For parts that are not described in detail in a certain embodiment, reference may be made to the relevant descriptions of other embodiments.

An embodiment of the present disclosure provides a display device, wherein the display device includes the display panel described in any one of the foregoing embodiments.

The technical features of the above embodiments can be combined arbitrarily. In order to make the description simple, all possible combinations of the technical features in the above embodiments are not described. However, as long as there is no contradiction in the combination of these technical features, it is considered to be within the range described in this specification.

The display panel, the control method of the display panel, and a display device provided by the embodiments of the present disclosure have been described above in detail. The principles and implementations of the present disclosure are described with specific examples. The descriptions of the above embodiments are only used to help understand the method of the present disclosure and its core idea; at the same time, for those skilled in the art, according to the idea of the present disclosure, there will be changes in the specific implementation and application scope. In conclusion, the content of this specification should not be construed as a limitation of the present disclosure.

What is claimed is:

1. A display panel, wherein the display panel comprises:

a substrate;

a pixel driving circuit disposed on the substrate, wherein the pixel driving circuit comprises a plurality of driving sub-circuits; and a pixel layer disposed on the substrate, wherein the pixel layer comprises pixel units arranged in an array, each of the pixel units comprises a red pixel, a green pixel, a first blue pixel, and a second blue pixel; each of the driving sub-circuits is in one-to-one correspondence with one color pixel, and the driving sub-circuits are used to drive a corresponding color pixel to light up, and a light transmission band of the first blue pixel is different from a light transmission band of the second blue pixel;

wherein in a first display mode, the pixel driving circuit drives the red pixels, the green pixels, and the first blue pixels to light up; or, in a second display mode, the pixel driving circuit drives the red pixels, the green pixels, and the second blue pixels to light up;

wherein an irradiance of wavelengths within a preset intensity range of allowable transmission wavelengths corresponding to blue light is less than or equal to 20% of an irradiance of the allowable transmission wavelengths corresponding to the blue light.

2. The display panel as claimed in claim 1, wherein a second color gamut range of the second display mode is larger than a first color gamut range of the first display mode.

3. The display panel as claimed in claim 1, wherein an allowable transmission wavelength of the first blue pixel is greater than 400 nanometers.

4. The display panel as claimed in claim 1, wherein in the allowable transmission wavelengths, a ratio of an energy of blue light with a wavelength of 415 nanometers to 455 nanometers to an energy of blue light with a wavelength of 400 nanometers to 500 nanometers is less than or equal to a preset threshold.

5. The display panel as claimed in claim 1, wherein a wavelength corresponding to an intensity extreme value of the light transmission band of the second blue pixel is less than 450 nanometers.

6. The display panel as claimed in claim 1, wherein a material of the pixel layer is quantum dots.

7. A control method of a display panel, applied to manufacture a display panel, wherein the display panel comprises a substrate; a pixel driving circuit disposed on the substrate, wherein the pixel driving circuit comprises a plurality of driving sub-circuits; and a pixel layer disposed on the substrate, wherein the pixel layer comprises pixel units arranged in an array, each of the pixel units comprises a red pixel, a green pixel, a first blue pixel, and a second blue pixel; each of the driving sub-circuits is in one-to-one correspondence with each color pixel, and the driving sub-circuits are used to drive a corresponding color pixel to light up, and a light transmission band of the first blue pixel is different from a light transmission band of the second blue pixel; wherein an irradiance of wavelengths within a preset intensity range of allowable transmission wavelengths corresponding to blue light is less than or equal to 20% of an irradiance of the allowable transmission wavelengths corresponding to the blue light; and wherein the control method of the display panel comprises:

acquiring color coordinates of each of the pixel units in a to-be-displayed image;

if the color coordinates all belong to a first color gamut range of a first display mode, lighting up the red pixels, the green pixels, and the first blue pixels corresponding to the first display mode;

if one of the color coordinates does not belong to the first color gamut range of the first display mode, but belongs to a second color gamut range of a second display mode, lighting up the red pixels, the green pixels, and the second blue pixels corresponding to the second display mode.

8. The control method of the display panel as claimed in claim 7, wherein before acquiring the color coordinates of each of the pixel units in the to-be-displayed image, the control method of the display panel further comprises:

acquiring optical parameters of the red pixels, the green pixels, the first blue pixels, and the second blue pixels; and defining the first color gamut range and the second color gamut range according to the optical parameters, the second color gamut range is larger than the first color gamut range.

9. The control method of the display panel as claimed in claim 7, wherein an allowable transmission wavelength of the first blue pixel is greater than 400 nanometers.

10. The control method of the display panel as claimed in claim 7, wherein in the allowable transmission wavelengths, a ratio of an energy of blue light with a wavelength of 415 nanometers to 455 nanometers to an energy of blue light with a wavelength of 400 nanometers to 500 nanometers is less than or equal to a preset threshold.

11. The control method of the display panel as claimed in claim 7, wherein a wavelength corresponding to an intensity extreme value of the light transmission band of the second blue pixel is less than 450 nanometers.

12. A display device, wherein the display device comprises a display panel, and the display panel comprises:

a substrate;

a pixel driving circuit disposed on the substrate, wherein the pixel driving circuit comprises a plurality of driving sub-circuits; and a pixel layer disposed on the substrate, wherein the pixel layer comprises pixel units arranged in an array, each of the pixel units comprises a red pixel, a green pixel, a first blue pixel, and a second blue pixel; each of the driving sub-circuits is in one-to-one correspondence with each color pixel, and the driving sub-circuits are used to drive a corresponding color pixel to light up, and a light transmission band of the first blue pixel is different from a light transmission band of the second blue pixel;

wherein in a first display mode, the pixel driving circuit drives the red pixels, the green pixels, and the first blue pixels to light up; or, in a second display mode, the pixel driving circuit drives the red pixels, the green pixels, and the second blue pixels to light up;

wherein an irradiance of wavelengths within a preset intensity range of allowable transmission wavelengths corresponding to blue light is less than or equal to 20% of an irradiance of the allowable transmission wavelengths corresponding to the blue light.

13. The display device as claimed in claim 12, wherein a second color gamut range of the second display mode is larger than a first color gamut range of the first display mode.

14. The display device as claimed in claim 12, wherein an allowable transmission wavelength of the first blue pixel is greater than 400 nanometers.

15. The display device as claimed in claim 12, wherein in the allowable transmission wavelengths, a ratio of an energy of blue light with a wavelength of 415 nanometers to 455 nanometers to an energy of blue light with a wavelength of 400 nanometers to 500 nanometers is less than or equal to a preset threshold.

16. The display device as claimed in claim 12, wherein a wavelength corresponding to an intensity extreme value of the light transmission band of the second blue pixel is less than 450 nanometers.

17. The display device as claimed in claim 12, wherein a material of the pixel layer is quantum dots.

* * * * *